(12) United States Patent
Roche et al.

(10) Patent No.: US 9,544,466 B2
(45) Date of Patent: Jan. 10, 2017

(54) SECURITY COMPLIANCE CHECKING OF DOCUMENTS

(71) Applicant: Xerox Corporation, Norwalk, CT (US)

(72) Inventors: Lee D. Roche, Pittsford, NY (US); Kishore Kumar Manikkoth Vasudevan, Chennai (IN); Ramesh Nagarajan, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/510,727

(22) Filed: Oct. 9, 2014

(65) Prior Publication Data

US 2016/0105584 A1  Apr. 14, 2016

(51) Int. Cl.
| | |
|---|---|
| H04N 1/40 | (2006.01) |
| H04N 1/32 | (2006.01) |
| G06F 3/12 | (2006.01) |
| G06F 21/60 | (2013.01) |

(52) U.S. Cl.
CPC ........ H04N 1/32149 (2013.01); G06F 3/1222 (2013.01); G06F 3/1238 (2013.01); G06F 21/608 (2013.01); H04N 1/32144 (2013.01); H04N 1/32325 (2013.01); H04N 1/32331 (2013.01); H04N 2201/0081 (2013.01); H04N 2201/0093 (2013.01); H04N 2201/0094 (2013.01); H04N 2201/327 (2013.01)

(58) Field of Classification Search
None
See application file for complete search history.

(56) References Cited

U.S. PATENT DOCUMENTS

| | | |
|---|---|---|
| 5,982,956 A | 11/1999 | Lahmi |
| 6,233,684 B1 | 5/2001 | Stefik et al. |
| 7,663,789 B2 | 2/2010 | Silverbrook et al. |
| 8,276,049 B2 | 9/2012 | Ishii |
| 8,300,877 B2 | 10/2012 | Jonsson et al. |
| 8,395,801 B2 | 3/2013 | Ferlitsch et al. |
| 8,423,628 B2 | 4/2013 | Tredoux |
| 8,437,027 B2 | 5/2013 | Moore et al. |
| 8,570,544 B2 | 10/2013 | Jung |
| 8,593,671 B2 | 11/2013 | Harrington et al. |
| 8,594,367 B2 | 11/2013 | Ohira |
| 2003/0039195 A1* | 2/2003 | Long ............... G03H 1/041 369/103 |

(Continued)

FOREIGN PATENT DOCUMENTS

| | | |
|---|---|---|
| EP | 1 555 139 A1 | 7/2005 |
| EP | 1 418 542 B1 | 3/2007 |

(Continued)

*Primary Examiner* — Helen Q Zong
(74) *Attorney, Agent, or Firm* — Richard H. Krukar; Kermit D. Lopez; Luis M. Ortiz

(57) ABSTRACT

The disclosed embodiments provide for checking documents for security compliance when the documents are printed, scanned, or copied. A security status is determined based on security indicators within a document's content. Security indicators can be located within a document's text, figures, watermarks, security marks, and invisible marks. Security indicators can be found by comparing a document's content to a set of stored indicator descriptions. The indicators found are used to determine a document score and security responses are triggered based on the document score.

20 Claims, 5 Drawing Sheets

(56) References Cited

U.S. PATENT DOCUMENTS

| | | | |
|---|---|---|---|
| 2005/0097335 A1 | 5/2005 | Shenoy et al. | |
| 2008/0050016 A1* | 2/2008 | Kawano | G06K 9/00456 382/175 |
| 2008/0151288 A1* | 6/2008 | Matsunoshita | G06F 21/608 358/1.15 |
| 2011/0051172 A1* | 3/2011 | Nakanowatari | H04N 1/00244 358/1.14 |
| 2012/0331571 A1 | 12/2012 | Vandervort | |
| 2014/0105449 A1* | 4/2014 | Caton | G06F 21/34 382/100 |
| 2015/0229784 A1* | 8/2015 | Wagner | H04N 1/00957 358/1.16 |
| 2016/0072968 A1* | 3/2016 | Nakamura | H04N 1/00241 358/1.15 |

FOREIGN PATENT DOCUMENTS

| | | |
|---|---|---|
| EP | 1 237 352 B1 | 6/2008 |
| EP | 1 956 821 A1 | 8/2008 |
| EP | 2 107 480 A1 | 10/2009 |

\* cited by examiner

SECURITY COMPLIANCE CHECKING OF DOCUMENTS

FIELD OF THE INVENTION

Embodiments are related to printers, scanners, fax machines, multi-function devices, optical character recognition, document security, and computer security.

BACKGROUND

The invention of literacy led to the production of documents. Shortly thereafter, the need to maintain information security was noticed. Early efforts at maintaining information security included limiting the number of literate people. In more modern times, literacy is widespread and information security is maintained, in part, by limiting document distribution. Documents have been given security levels such as confidential, secret, top secret, and eyes only to indicate who may access the document. Some levels of document security are administrative rules within organizations whereas others are legal requirements. HIPAA requires certain security measures for people's medical records. There are similar legal requirements for the financial data and reports of publicly traded corporations. Likewise, government documents are often classified within one of numerous security levels and unauthorized access or distribution of those classified documents can lead to criminal charges.

Maintaining information security by limiting the distribution of documents has become difficult with the widespread availability of printers, scanners, facsimile machines, and multi-function devices ("MFDs") because it has become so trivial to create electronic or physical copies. In order to preserve information security, copies of documents must be subject to the same controls as the originals. Systems and methods for securing information and documents in the presence of printers, scanners, facsimile machines, and MFDs are needed.

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

Aspects of the embodiments address limitations and flaws in the prior art by searching for security indicators in documents and, based on the security indicators, triggering a security response in conformance with stored rules or associations.

It is therefore an aspect of the embodiments that a printing subsystem that prints text, images, and other markings onto sheets of printable media is augmented with certain document security capabilities.

It is another aspect of the embodiments that a document description input receives a document description. The document description input can receive an electronic document description, such as a pdf file, from a communications network or can receive and scan a physical document to thereby obtain an electronic document description. A scan of a physical document can be submitted to an optical character recognition (OCR) module to transform the scan into a more useful format that includes the document text as character data in addition to image data.

It is yet another aspect of the embodiments that an examination module receives and analyzes the document description to determine if the document contains any security indicators. The examination module produces a document score indicative of the security indicators found in the document. For example, a document with the word "Secret" in the header could have a document score indicative of a security level of "1" (numerical), "Secret" (string), flags in an array or data structure for "Secret" in "Header", or other data or data structures.

It is a further aspect of the embodiments that an indicator storage module can store security specifications. Security specifications can associate security levels (flag, string, number, etc.) with indicator descriptions. Indicator descriptions specify security indicators. For example, an indicator description can specify the word "Secret" being in the header or can specify a bitmap having significance to document's security status. An example of such a bitmap could be the logo or shield for the U.S. Central Intelligence Agency. An indicator description is associated with a security level such as the numerical security level "1" being associated with the indicator specification for "Secret" in the header. On examining a document with "Secret" in the header, the system can determine which indicator description is matched and assign a security level of "1". Alternatively, the system can provide an array flagging which indicator descriptions are matched, can provide one or more strings indicating which security indicators are matched, or in some other way produce a document score containing data indicative of the indicator descriptions matched by a particular document.

It is yet another aspect of the embodiments that a security management module stores security rules that relate document scores to security rules. For example, an unknown user can attempt, at a secure location, to copy a document having "Secret" in the header. The examination module can assign a document score of "1" to the document. The security management module determines, based on its stored rules or associations, that it should log user and location, present a security dialog to the unknown user, and issue "Alert1." Alert1 can be a security response such as alerting security personnel to check the situation by means of remote video surveillance. Note that security rules can be simple relations such that certain security levels trigger certain security responses or can be more complex rules containing logical operators.

It is yet another aspect of the embodiments that an administrator can use a security management interface to interact with the security management module or indicator storage module. For example, a company can try to ensure that its annual report is only seen by a very restricted set of people until the day that it is published. After that date, the company ceases restricting the annual report and instead tries to widely disseminate it. An administrator tasked with securing the annual report can enter or upload an indicator description for "Annual Report" in the document footer and another for "Annual Report" in the document title page, first page, or cover sheet. The Administrator can also enter security rules into the security management module to log user and location data whenever a document matching the "Annual Report" indicator descriptions is copied or printed, but only before a certain date. The two "Annual Report" indicators can be associated with security level "6" such that annual reports have that security level. It is through the security management interface that the administrator enters instructions for amending the security rules or indicator descriptions where the action of amending the rules or descriptions includes amending a rule or an indicator, creating/entering/uploading a rule or an indicator, or deleting a rule or an indicator. The security management module, indicator storage module, or other system components amend the rules or indicators in conformance with the instructions.

BRIEF DESCRIPTION OF THE FIGURES

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION

The particular values and configurations discussed in these non-limiting examples can be varied and are cited merely to illustrate embodiments and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The disclosed embodiments are described in part below with reference to flowchart illustrations and/or block diagrams of methods, systems, and computer program products and data structures according to embodiments of the invention. It will be understood that certain blocks of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a non-transitory computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The disclosed embodiments provide a convenient way for checking the security compliance of documents and for administrating the security compliance of documents. The documents to be secured contain security indicators that can be easily visible to the casual observer or that can be hidden or disguised within the documents. Administrators can administrate indicator descriptions that describe the security indicators and can administrate how the system should respond upon discovering certain security indicators in certain situations.

Figure 1:
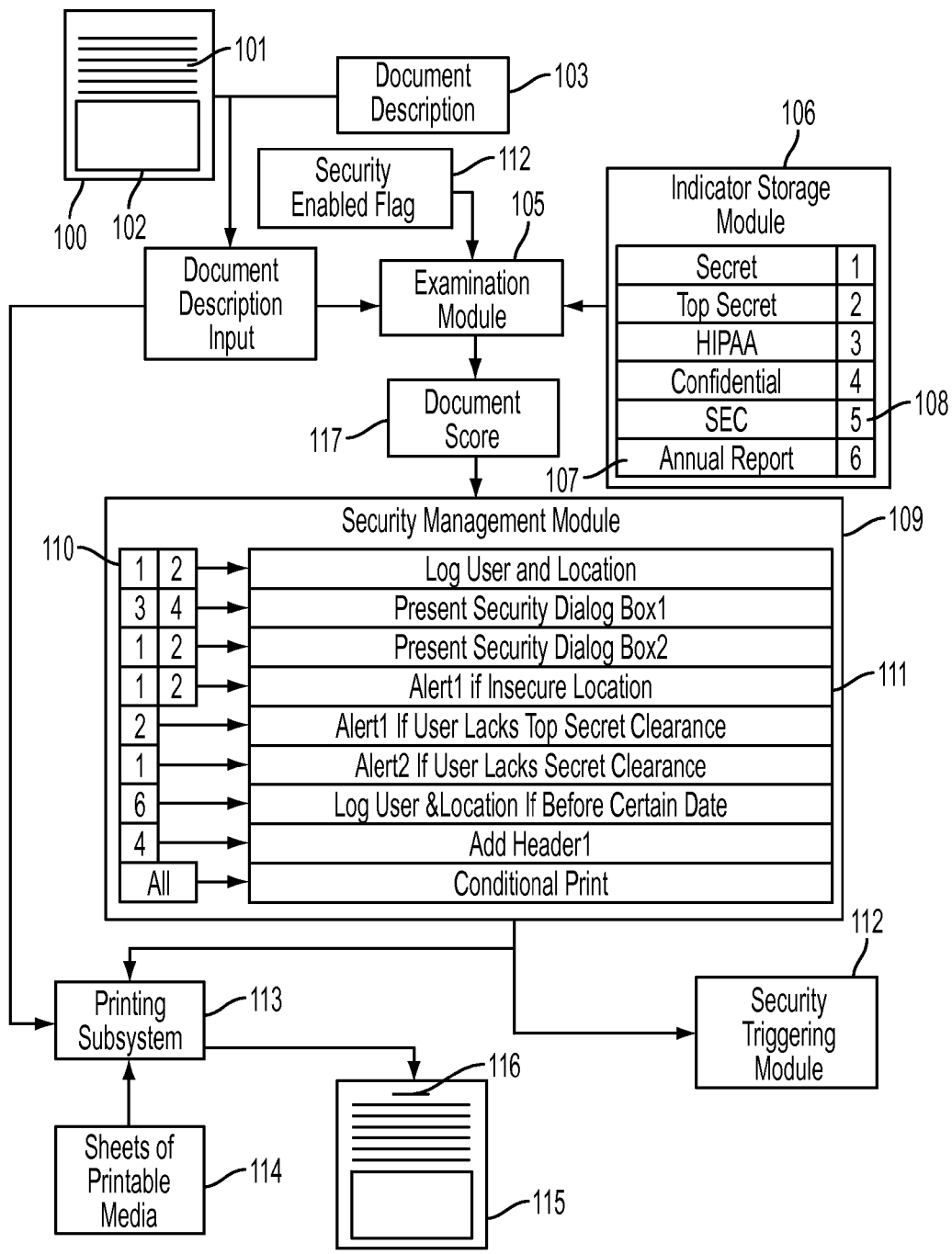
FIG. 1 illustrates a high level diagram of a system checking the security compliance of documents in accordance with aspects of the embodiments.

FIG. 1 illustrates a high level diagram of a system checking the security compliance of documents 100, 103 in accordance with aspects of the embodiments. The first document 100 is a physical document containing text 101 and images 102 to be copied. The second document is a document description 103 to be printed. Document descriptions are data, such as a pdf file, describing a document such that the document description can be preprocessed, analyzed, automatically amended, and perhaps printed. A document description input can directly receive a document description 103 from a communications network or can scan a physical document 100 to thereby obtain a document description.

An examination module 105, perhaps on a distant server, receives a document description from the document description input 104 and, if security is enabled by a flag 112 or other means, examines the document description in an attempt to find security indicators. The security indicators are specified by indicator descriptions 107 stored in an indicator storage module 106 in association with security levels 108. In essence, the indicator descriptions 107 tell the examination module 105 what to look for and examination module reports what it found in a document score 117 containing none, one, or more security levels. For example, a document having "HIPAA" in its header and "Confidential" in its footer can have a variety of document scores depending on how the system is configured. The document score can contain two numerical indicators, "3" for HIPAA and "4" for Confidential. It can contain only one of the indicators, such as "3" if HIPAA is deemed more important than Confidential. It can contain the strings "HIPAA" and "Confidential". It can contain data structures indicating which indicator(s) was found and where found. A non-limiting XML-like example of such a data structure is: "<docScore><indicator string='HIPAA' level=3 location='header'><indicator string='Confidential' level=4 location='footer'></docScore>." Note that it is possible for different indicator descriptions to have the same security level. It is also possible for security levels to be very specific such that "HIPAA" has one security level if in the header and a different one if in the footer. Different security administrators will prefer different granularity amongst security levels and, as such, the system can accommodate their needs.

The document score 117 is passed to a security management module 109. As with the examination module 105 and the indicator storage module 106, the security management module 109 can be instantiated within a printer, scanner, facsimile machine, or MFD as a direct augmentation or can be instantiated in a remote server. The security management module 109 of FIG. 1 relates possible security levels 110 to security responses 111. As illustrated, security level "1" has five security responses, the fifth one being "Conditional Print" meaning print unless prevented by, for example, a negative response to a security dialog box. The security triggering module 112 triggers security responses such as Alert1 and Alert2 that can be indicative of, respectively, arresting the user and remotely monitoring the user. The security triggering module can also pass logging data to remote servers or data stores.

The printing subsystem 113 can receive a document description and print it on sheets of printable media 114 as a physical document 115. Here, the system has assigned the document a "Confidential" or "4" security level and has therefore added an appropriate header 116. Note that other security levels or responses can include adding covert security marks such as watermarks, invisible marks (perhaps printed with normally invisible ink), or covert dot patterns that are not noticeable unless being specifically looked for by an individual knowing what to look for.

FIG. 1 shows that security dialogs can be presented to the user. A security dialog can be configured by the administrator and can inform the user that he is attempting to copy a secure/confidential/secret, etc., document that his actions will be logged or monitored, and would he like to continue. Selecting "Yes" could result in printing, logging, and other responses. Selecting "No" could result in the same or different logging and responses, but no printing.

Figure 2:
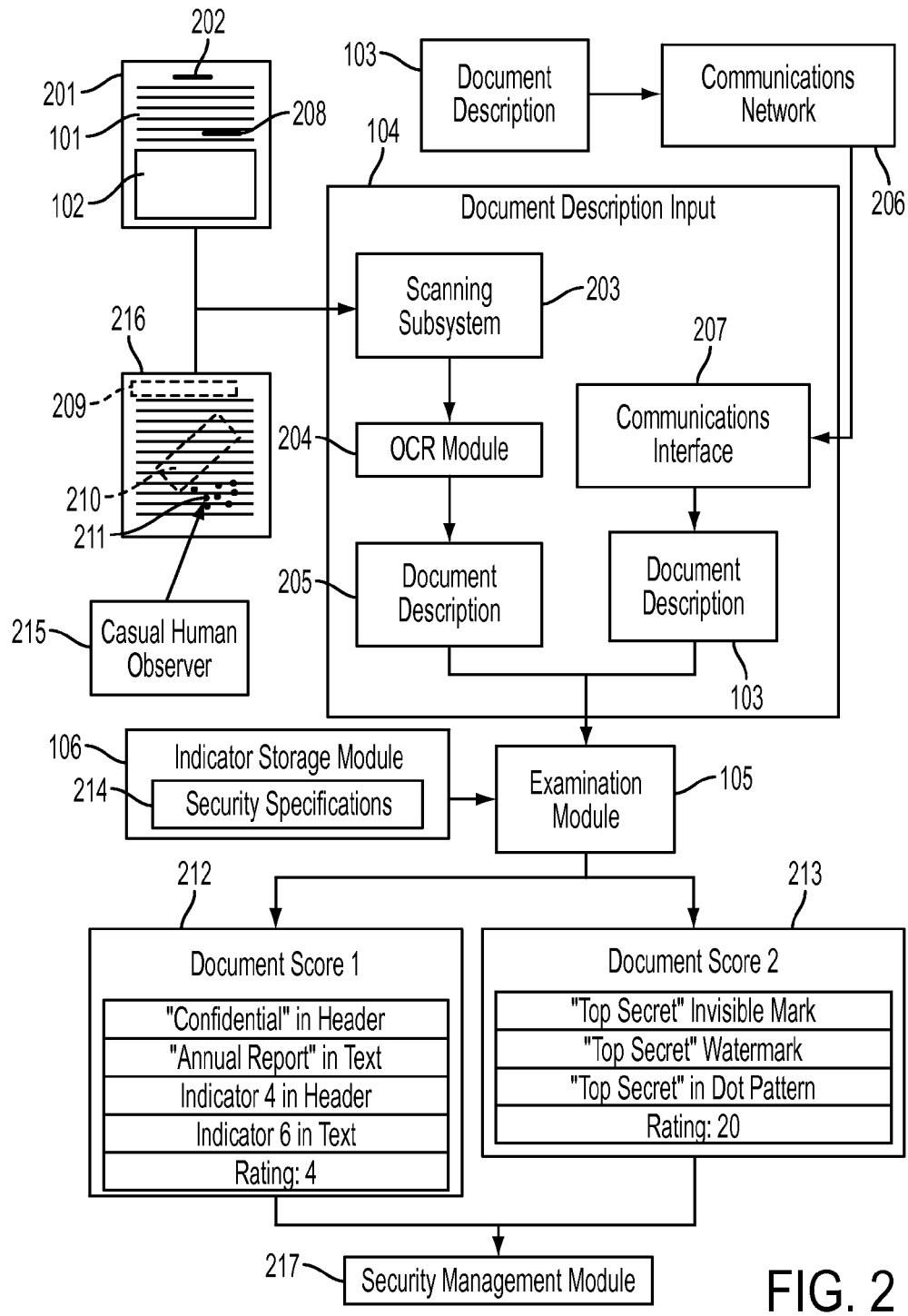
FIG. 2 illustrates a high level flow diagram of obtaining document descriptions and producing document scores in accordance with aspects of the embodiments.

FIG. 2 illustrates a high level flow diagram depicting logical operational steps or instructions for obtaining document descriptions and producing document scores, in accordance with aspects of the disclosed embodiments. As shown in FIG. 2, A first document 201 is a physical document 201 having an overt security indicator 202 in its header, another overt security indicator 208 in its text 101, and an image 102. A second document 216 has an invisible security indicator 209 in its header, a watermark 210, and a covert dot pattern 211. The covert dot pattern can be unique to the document and difficult for a casual human observer 215 to notice. For example, the dot pattern can appear as fly specs or printer abnormalities, can be very light yellow or grey specs, etc. A 300 DPI printer is quite capable of printing dots so small and light, or otherwise matched to their background, that they are not noticed, looked for.

The document description input 104 has a scanner 203 for scanning physical documents and an OCR module 204 for converting suitable parts of the scan to textual data with the result being a document description 205 suitable for submission to the examination module 105. The document description input 104 also has a communications interface 207 connected to a communications network 206 such that it can receive document descriptions 103. Many document descriptions 103 received from the communications network 206 can be submitted directly to the examination module 105 while others will be raw document scans that must first be OCRed as if locally scanned.

The examination module 105 obtains security specifications 214 from the indicator storage module 106 and attempts to find security indicators in the document descriptions 205, 103. Document score 1 212 exemplifies a possible document score for document 201. "Confidential" was found in the header and the text mentioned "annual report". Due to the system's configuration, security levels as well as strings are reported: Indicator 4 in header, indicator 6 in text. The examination module also provided an overall rating of 4, Confidential, to the document corresponding to a confidential rating.

Document score 2 213 exemplifies a possible document score for document 216 which has "Top Secret" as an invisible header, as a watermark, and indicated by a covert dot pattern. The examination module 213 has not reported numerical security levels, but could have if the administrator chose such a configuration. The examination module 213 has assigned a rating of 20 to document 216 because the administrator chose that rating for documents having a "Top Secret" indicator in any location. Note that the system can report the highest numbered rating in instances when two ratings are possible such as a top secret document with "annual report" in the text. Alternatively, the administrator can set up rules such that certain ratings override others.

The document scores 212, 213 are then passed to the security management module 217. Note that in FIG. 1, security management module 109 appears configured to accept document scores containing single numerical security levels. Other embodiments can use key-value pairs to associate security levels with security responses and, as such, the security levels can be any string such as "4", "Secret" or "Confidential in Header."

Figure 3:
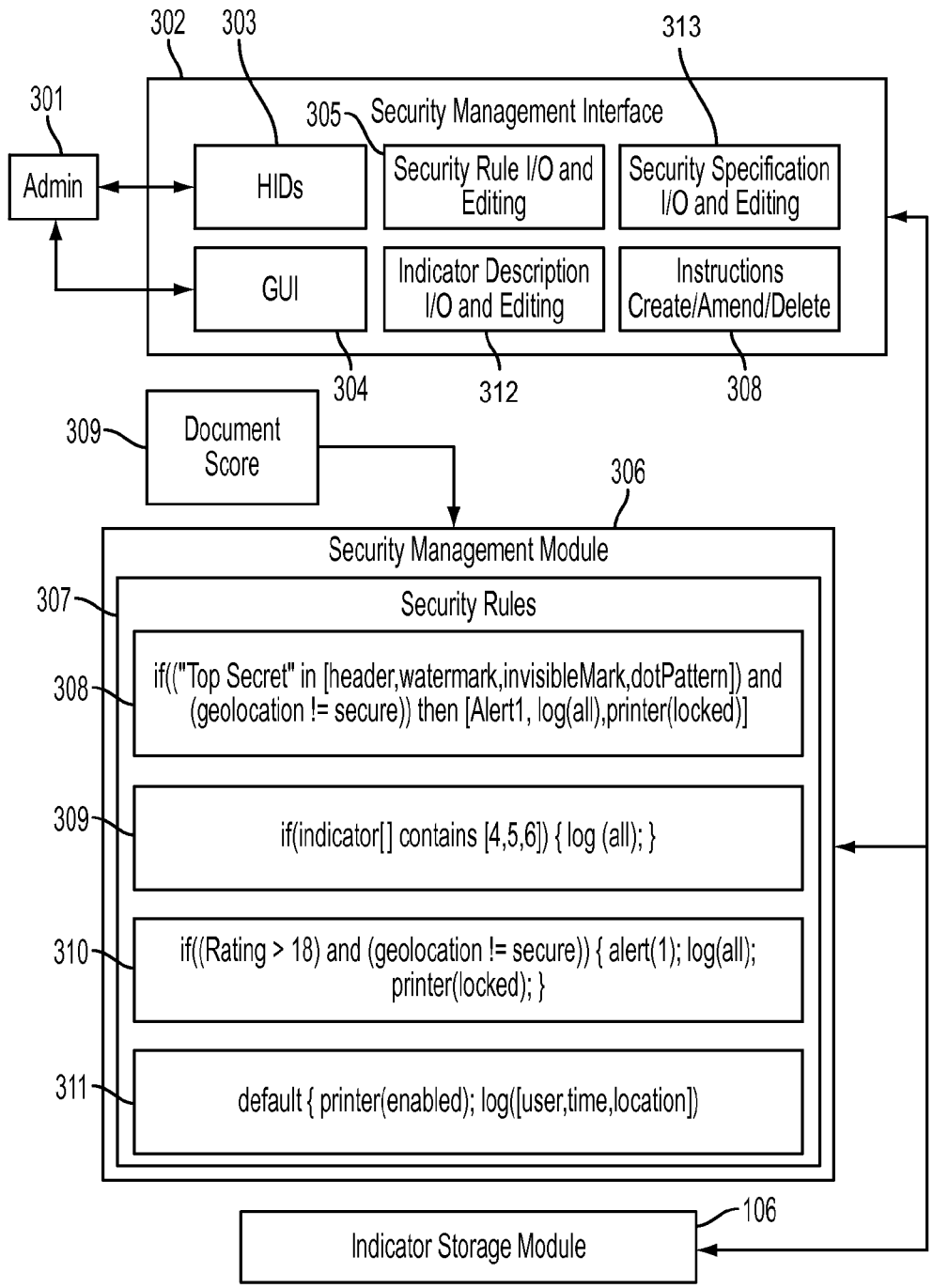
FIG. 3 illustrates a high level diagram of an administrator amending security rules in accordance with aspects of the embodiments.

FIG. 3 illustrates a high level diagram of an administrator 301 amending security rules 307 in accordance with aspects of the embodiments. The administrator 301 can interact with a security management interface 302 by manipulating or controlling human interface devices ("HIDs") 303 and a graphical user interface ("GUI") 304. Keyboards, mice, trackballs, display screens, speakers, kinects, and touch screens are examples of HIDs. The GUI 304 can be displayed on a computer monitor or other output device supplying visual information. In some cases, the administrator will use a command line interface such as a terminal instead of a simpler to use GUI 304.

The security management interface 302 provides access, usually password protected, to the security rules, indicator descriptions, and security specifications. The security management interface 302 can obtain the security rules, indicator descriptions, and security specifications such that they can be presented to the administrator on the GUI 304 or terminal type display for amendment. For example, the administrator 301 can interact with the security management module 302 for security rule I/O and editing 305. Instructions 308 are issued to obtain the security rules 307 which are then presented to the administrator 301. The administrator 301 can then edit, delete, or create security rules and cause the security management interface 302 to pass along instructions 308 for the desired operations to the security management module 306. Similar operations can be used for indicator description I/O and editing 312 and security specification IO and editing 313. The security management interface 302 also provides the administrator 301 with the capability to upload or down load security rules, indicator descriptions and security specifications.

The security rules, indicator descriptions, and security specifications (hereinafter "security elements") can be obtained through API's into the underlying modules such as the security management module 306, through database queries, or other means. Security elements can be obtained directly from the printer/scanner/fax/MFD or from a remote server. In any case, the administrator can create, modify, delete, and manage security elements through use of the security management interface 302. In some embodiments, the security management interface 302 provides access to only one printer/scanner/fax/MFD. In other embodiments, the security management interface 302 provides access to multiple devices and can even provide for synchronizing the security elements amongst devices or transferring security elements from one device to another. Yet other embodiments can provide for centralized management wherein security elements are amended in a data store and with the changes propagated to a population on devices.

The security rules 307 illustrated in FIG. 3 are different from those shown in FIG. 1. Security rules 307 are logical rules presented in a generic pseudo-code for purposes of illustration. Document score 309 provides richer data than the single numerical security level discussed above, perhaps more akin to document score 1 212 and document score 2 213. The security rules 307 as illustrated contain conditional operators, comparison operators, and logical operators. "If" clauses are examples of conditional operators. Comparison operators include "=" and "!=." Logical operators include "and," "or", "nor," and 0"nand." A number of other operators are used such as "contains" which is true if a list or array contains a specified element. Function or API calls are also illustrated such as "log( )" and "printer( )" that will be described below.

The first security rule 308 looks for the string "Top Secret" in any of the locations in the bracketed list. It also looks to see if the device is in an insecure location. If both are true, then the logical "and" of them is true. Someone is trying to copy a top secret document in an insecure location. The security responses are in the second bracketed list: Alert1, log(all) and printer(locked). Alert1 could be a loud alarm and a summoning of security personnel. "log(all)" can be a function or API call causing "all" the details of the requested copy operation to be logged. Similarly, "printer (locked)" can be a function or API call that locks the printer from doing anything until cleared by security or administrative personnel or perhaps a timer.

The second security rule 309 can take effect when the document score 309 contains one or more security levels or numerical security indicators. Multiple security indicators can be contained in a list or other communicated data structure. The system logs "all" the details of the requested copy operation if the numerical security indicator(s) is, or contains a 4, a 5, or a 6.

As with the first security rule 308, the third security rule 310 is designed for strongly responding when someone tries to copy a top secret document in an insecure location. Document score 2 213 has a rating of "20" for a top secret document. The third security rule 310 is otherwise similar to the first security rule 308.

The fourth security rule 311 is an example of a default rule that matches every document that is not matched by any other rule. By default, the printer is enabled and the system logs the user, time, and location of the operation.

Figure 4:
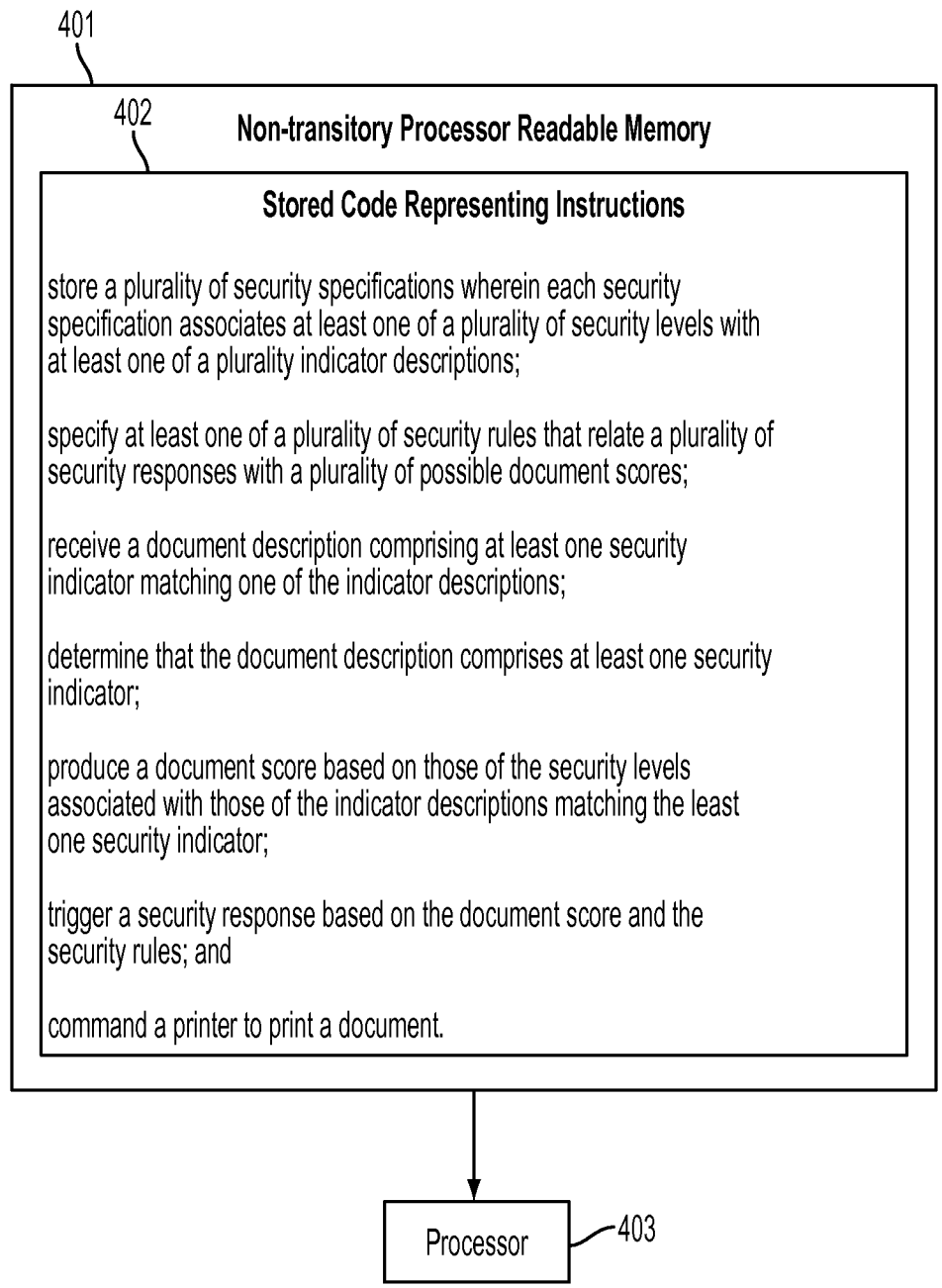
FIG. 4 illustrates a high level diagram of a processor executing stored code representing instructions for carrying out certain aspects of the embodiments.

FIG. 4 illustrates a high level diagram of a processor 403 executing stored code representing instructions 402 for carrying out certain aspects of the embodiments. The instructions 402 can be stored in a non-transitory readable medium 401. Note that the particular instructions illustrated are illustrative only and are not intended to be limiting in any manner.

Figure 5:
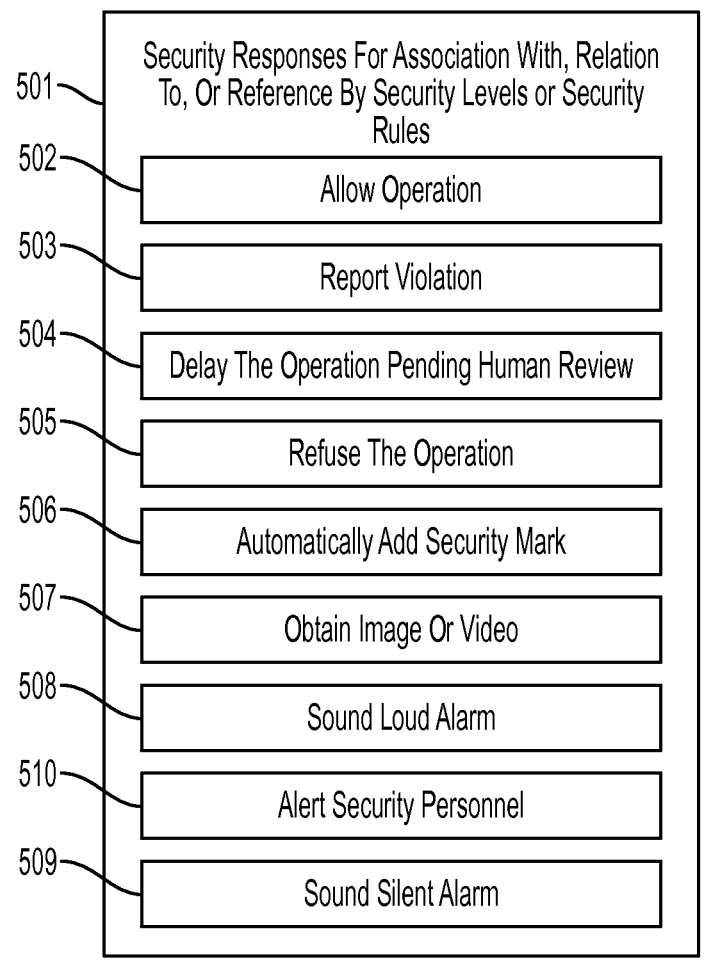
FIG. 5 illustrates a high level diagram of security responses for association with, relation to, or reference by security levels or security rules in accordance with aspects of the embodiments.

FIG. 5 illustrates a high level diagram of security responses for association with, relation to, or reference by security levels or security rules 501 in accordance with aspects of the embodiments. The security responses illustrated are: allow operation 502; report violation to suitable personnel or log file 503; delay the operation pending human review 504; refuse the operation 505; sound silent alarm 509; sound loud alarm 508; alert security personnel 510; obtain image or video 507; and automatically add security mark 506. Numerous security responses can be triggered by a single document.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A method comprising:
   obtaining a plurality of security levels wherein the security levels are predefined and stored within a document printing system;
   storing a plurality of security specifications within the document printing system wherein each security specification associates at least one of the security levels with at least one of a plurality of indicator descriptions;
   storing a plurality of security rules within the document printing system wherein the security rules relate a plurality of security responses with a plurality of possible security levels;
   receiving at least one instruction for amending the security rules in conformance with the at least one instruction;
   receiving a document description from a communications network, the document description comprising at least one security indicator matching one of the indicator descriptions and wherein a document description input comprises a communications interface that receives an additional document description from the communications network;
   determining that the document description comprises at least one security indicator and producing a document score based at least in part on those of the security levels associated with those of the indicator descriptions matching the at least one security indicator and also at least in part on the location of a printing subsystem, wherein the document score comprises a list of the indicator descriptions matching the at least one security indicator;
   triggering at least one of the security responses based on the document score, and the security rules, an operation type indicating an operation currently being attempted, a user identifier indicating the person attempting the operation, wherein the security response is selected from a plurality of security responses; and
   printing, by the printing subsystem, text, images, and other markings onto sheets of printable media.

2. The method of claim 1 wherein the security responses comprise allowing the operation.

3. The method of claim 1 wherein the at least one security indicator corresponds to a covert indicator wherein printing the document description produces the covert indicator.

4. The method of claim 3 wherein the covert indicator comprises a dot pattern covertly printed on a document.

5. The method of claim 1 wherein the security responses comprise remotely monitoring the user.

6. The method of claim 1 wherein the security responses comprise passing logging data to a remote server.

7. The method of claim 1 further comprising presenting a password protected user interface to an administrator and accepting an additional one of the indicator descriptions from the administrator utilizing the user interface.

8. The method of claim 1 further comprising accepting an indicator description from a person operating a user interface.

9. A document printing system that manages document security and that prints text, images, and other markings onto sheets of printable media comprising:
   a plurality of security levels wherein the security levels are predefined and stored within the document printing system;
   a printing subsystem that prints the text, the images, and the other markings onto the sheets of printable media;
   a plurality of security specifications wherein each security specification associates at least one of the security levels with at least one of a plurality of indicator descriptions, and wherein the document printing system stores the security specifications within the document printing system;
   a plurality of security rules that relate a plurality of security responses with a plurality of possible security levels, and wherein the document printing system stores the security rules within the document printing system;
   a document description input that receives a document description comprising at least one security indicator matching one of the indicator descriptions wherein the document description input further comprises a communications interface that receives an additional document description from a communications network;
   wherein the document printing system determines that the document description comprises at least one security indicator and produces a document score based on those of the security levels associated with those of the indicator descriptions matching the at least one security indicator, wherein the document score comprises a list of the indicator descriptions matching the at least one security indicator; and
   wherein the document printing system triggers at least one of the security responses based on the document score, the security rules, an operation type indicating an operation currently being attempted, and a user identifier indicating the person attempting the operation;
   wherein the security response is selected from a plurality of security responses.

10. The document printing system of claim 9 wherein at least one of the security rules contains a conditional operator, a logical operator, and a comparison operator.

11. The document printing system of claim 9 wherein the document printing system triggers the security response based at least in part on the time of day, the day of the week, and a security screen enabled flag.

12. The document printing system of claim 11 wherein the security responses comprise allowing the operation.

13. The document printing system of claim 11 wherein the security responses comprise temporarily delaying a printing or copying operation pending human review.

14. The document printing system of claim 11 wherein the security responses comprise refusing the operation.

15. The document printing system of claim wherein the security response comprise obtaining video or an image.

16. The document printing system of claim 9 wherein the security response comprises alerting security personnel.

17. The document printing system of claim 9 wherein the document description input comprises a scanning subsystem and OCR module that produce the document description by scanning a document and recognizing the characters printed on the document, wherein the document description input further comprises a communications interface connected to a communications network, and wherein the document description input obtains another document description from the communications network.

18. A non-transitory processor-readable medium storing code representing instructions to cause a processor to perform a process, the code comprising code to:
   read a plurality of security levels wherein the security levels are predefined and stored within a document printing system;
   store a plurality of security specifications wherein each security specification associates at least one of the security levels with at least one of a plurality of indicator descriptions;
   specify at least one of a plurality of security rules that relate a plurality of security responses with a plurality of possible security levels;
   receive a document description comprising at least one security indicator matching one of the indicator descriptions wherein a document description input further comprises a communications interface that receives an additional document description from a communications network;
   determine that the document description comprises at least one security indicator;
   produce a document score based at least in part on those of the security levels associated with those of the indicator descriptions matching the at least one security indicator and also based at least in part on the geolocation of a printer wherein the document score comprises a list of the indicator descriptions matching the at least one security indicator;
   trigger a security response based on the document score, the security rules, an operation type indicating an operation currently being attempted, a user identifier indicating the person attempting the operation wherein the security response is selected from a plurality of security responses, the security responses comprising: allow operation, refuse the operation, and obtain image or video; and
   command the printer to print a document based on the document description.

19. The non-transitory processor-readable medium of claim 18 wherein the code further comprises code to:
   present a user interface on a display device; and
   upload additional indicator descriptions utilizing the user interface.

20. The non-transitory processor-readable medium of claim 18 wherein the code further comprises code to:
   present a user interface on a display device; and
   create, amend, or delete one or more of the security indicator specifications utilizing the user interface.

* * * * *